United States Patent Office 3,738,973

Patented June 12, 1973

3,738,973

FUROIC ACID ESTERS OF HYDROXY-CONTAINING POLYMERS

Sidney Augarten, Bronx, Kailash C. Pande, Farmingdale, and Stanley E. Kallenbach, Roslyn Heights, N.Y., assignors to Powers Chemco, Inc., Glen Cove, N.Y.

No Drawing. Filed Jan. 7, 1971, Ser. No. 104,804
Int. Cl. C08f *15/02;* C08g *17/14;* G03c *5/00*
U.S. Cl. 260—88.1 P 5 Claims

ABSTRACT OF THE DISCLOSURE

Light-sensitive film forming polymers are disclosed which comprise recurring units of furoate-esterified polymeric alcohols selected from phenoxy resins, polyesters and styrene-allyl alcohol copolymers. The utilization of these photosensitive materials in photolithography and photomechanical processes is also described.

BACKGROUND OF THE INVENTION

This invention relates generally to new photopolymers for use in photolithography and photomechanical processes and, more particularly, to light-sensitive organic solvent soluble film forming polymers capable of forming a continuous coating on a base consisting of furoate esterified polymers.

For many years, photomechanical reproduction has depended primarily upon the use of a colloidal layer of gum arabic or other similar material containing a photosensitive hardening agent such as a bichromate salt. More recently, the use of light sensitive diazo compounds has resulted in the manufacture of presensitized plates, i.e., plates to which the light sensitizing agent may be applied prior to actual use. The bichromated colloids and the diazo compounds, however, have several material disadvantages which restrict their application and use.

One such inherent disadvantage of the diazo compounds, for example, is their tendency to decompose chemically upon contact with a metal surface. Consequently, when a diazo compound is to be used over a metal plate, an intervening protective sublayer must be used. If the sublayer is not properly formed, the resulting lithographic plate may be defective or have a short storage life.

Bichromated colloids deteriorate relatively rapidly after coating thus making them unsuitable for use when long shelf life is desired. Moreover, many of the colloidal light sensitive materials presently employed as resists for etching require a relatively high temperature oven bake prior to use, thereby increasing the cost and complicating the process of preparation.

It has now been found that hydroxyl-containing polymers, as exemplified by the following structural backbones may be synthetically modified to provide the novel polymers of this invention:

(a)

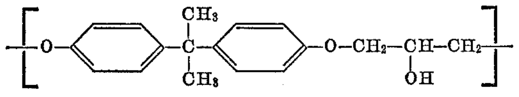

(b)

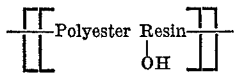

(c)

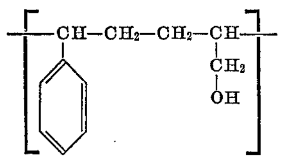

The above illustrated polymers are esterified with furoic acid or a derivative thereof to yield the desired furoate-containing polymers found to be advantageous light-sensitive materials in photolithography and photomechanical processes. Other hydroxyl-containing film-forming polymers may also be used.

SUMMARY OF THE INVENTION

Accordingly, this invention discloses and claims a light-sensitive organic solvent soluble film forming polymer capable of forming a continuous coating on a base which comprises recurring units of a furoate-containing polymer having the structures:

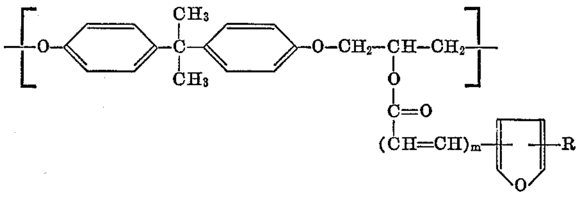

or

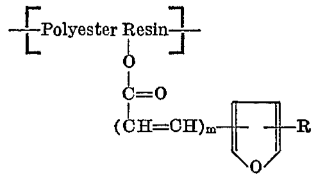

or

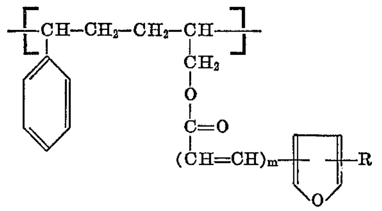

wherein R is H, alkyl or alkenyl of up to 12 carbon atoms, aryl, alkaryl or aralkyl of from 6 to 9 carbon atoms, halogen (F, Cl, Br, I), nitro, cyano, hydroxy, acetylamino, amino, alkoxy, carboalkoxy, mono- or di-alkylamino, N-alkyl-carbamyl, N,N-dialkylcarbamyl, alkylsulfonyl, said alkyl groups containing from 1 to 4 carbon atoms, trifluoromethyl, trifluoromethoxy, methoxymethyl, carbamyl, alkanoyloxy containing up to 4 carbon atoms, phenyl, p-chlorophenyl, p-methylphenyl or p-aminophenyl; and *m* is a whole number from 0 to 1, said polymer having a molecular weight of from 1500 to 115,000.

Preferred is a polymer as described above wherein at least 50% of the possible —OH groups on the polymer molecule are esterified as shown. Even more preferred is a polymer wherein at least 70% of the possible —OH groups are esterified.

Another preferred embodiment relates to the combination of the above polymers or other hydroxyl-containing film-forming polymers with a sensitizing agent, such as a cyclic compound which contains one or more carbonyl groups.

Especially desirable polymers for purposes of this invention include those in which the esterifying substituent is furoate, 5-methyl-2-furoate or 5-bromo-2-furoate.

Another preferred embodiment of the present invention relates to a process for producing photographic resist images by the photochemical cross-linking of a polymeric material which comprises exposing a photographic element to actinic light through a process transparency wherein said photographic element comprises a support or substrate having thereon a photosensitive layer comprising a polymer as shown above whereby in the exposed areas said polymeric material is cross-linked to the insoluble state and after removal of the soluble photosensitive material in the unexposed areas, results in a photographic resist image.

It is the purpose of this invention to provide a new class of film forming polymers which are sensitive to light. These polymers are effectively used in the preparation of photographic resist materials, printing plates for lithography, etc.

DETAILED DESCRIPTION OF THE INVENTION

The herein described polymers are prepared by an esterification procedure whereby a polymeric alcohol is reacted with a furoic acid derivative resulting in a furoate-esterified polymer in which at least 50% of the available —OH groups on said alcohol are esterified.

The polymeric alcohol starting materials are catetgorized into three groups for purposes of this invention. They are phenoxy resins of the structure (a) designated above, polyesters of the type shown as (b) above and styrene-allyl alcohol copolymers shown as (c) above.

These materials are easily prepared applying well-documented synthetic procedures or are available on a commercial scale.

For instance, phenoxy resin PKHH, a trademarked product of Union Carbide, is a typical example of material (a). Phenoxy resins of this structure are generally formed by copolymerization of bisphenol A and epichlorohydrin. The resulting compound will normally have secondary hydroxyl groups, however, primary hydroxyl groups may also arise if the epoxide ring opens on the opposite side. These resins usually have a molecular weight of at least about 20,000, generally 20,000 to 30,000 and may be even higher if desirable to produce a tougher film and one with greater insolubility after exposure to an actinic light source.

The second type of polymer starting material applicable for purposes of this invention are polyesters. The word "polyester" is derived from a production process which involves the esterification condensation of alcohols and acids.

For purposes of this invention, it contemplates products which are obtained from the reaction between dibasic acids, saturated or unsaturated with polyfunctional alcohols. Typical examples of dibasic acids or anhydrides thereof include maleic, fumaric, adipic and phthalic. Illustrative of suitable alcohols include ethylene glycol, propylene glycol, glycerol and citric acid. These materials can vary widely in molecular weights depending on the manner in which they are synthesized. However, for use herein, they must exhibit molecular weights in the range from 1500 to 115,000.

The third type of polymer is the resin obtained by the copolymerization of styrene and allyl alcohol. By regulating the copolymerization reaction conditions, one can obtain a polymer of varying molecular weight and —OH number. It is preferred for application herein to use a copolymer having a molecular weight from 1600 to 2500 and an —OH contetn of 5 to 8%; although, polymers having a molecular weight as high as 100,000 are applicable.

The above described polymers can be furoylated by use of any of the presently available furoylating compounds which contain the furoyl radical capable of attaching to the polymer through reaction with hydroxy groups on the polymer. Exemplary of furoylating agents useful in preparing photopolymers are the following: furoic acid, furoyl chloride and amides of furoic acid. For the sake of better yields and ease of reaction, the acid chloride is most preferred.

In addition, this invention contemplates furoate esters which derive from derivatives of furoic acid. For instance, furoyl chloride may be substituted with the following: alkyl, halogen, nitro, etc. These derivatives may be represented by the following formula:

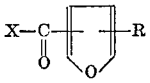

wherein X can be —OH, Cl or $NH_2$ and preferably —Cl, and R is a substituent as defined above. Of course, the R moiety must not interfere with the esterification procedure. Many of these furoic acid derivatives are sold commercially. However, they can also be obtained by syntheses outlined in the prevailing art. Such teachings are obvious to a chemist trained in this art.

A typical procedure for preparing a furoate-containing polymer as defined herein is as follows: The hydroxy-containing ester or resin is dissolved in a solvent, for example, pyridine and subsequently treated with the furoylating agent such as furoyl chloride. In most instances, the reaction is exothermic and no external heat is required. In those instances where it is not, a small amount of heat will be applied to hasten the rate of reaction. The reaction temperature will usually not be greater than 100° C. depending on the particular solvent.

Any solvent is applicable so long as it does not react with starting reagents or final products. Illustrative of the solvents applicable are: hydrocarbons, chlorinated hydrocarbons, ethers, etc.

The reaction work-up is typical for polymer isolation: a solvent such as acetone is highly effective in dissolving small amounts of organic impurities and is added for that purpose. Other solvents may serve in that capacity as well. The entire mixture after dilution with acetone is then poured into a large volume of water. The actual amount is not critical and will generally be about twice the volume of the reaction mixture. An excess is used simply to insure the complete precipitation of desired product.

The polymeric materials within the purview of this invention are light-sensitive and are capable of being sensitized to increase their senstivity to actinic rays. The photosensitive resist solution which consists of the above described polymers dissolved in a solution may be coated on a plate to become a printing member of other etched or plated surface and, after drying and exposure to actinic light, may be developed to remove the unexposed portions of the polymer by immersion in a suitable organic solvent. Thereafter, the plate may be etched or plated in a conventional manner.

Among the useful volatile organic solvents which contain the polymers described herein include: 1,4-dioxane, methyl glycol esters, nitromethane, ethylene dichloride, butyrolactone, diethylene glycol ethers, chloroform, methylethyl ketone and other organic nonreactive solvents. Many of the same solvents may also be used as a developer.

The sensitizer which can be added to the polymer containing solution contains one or more carbonyl groups. Representative examples include:

4-methyl benzophenone
4,4'-bis-dimethlyamino benzophenone
4,4'-bis-diethylamino benzophenone
bis-p-methylstyryl ketone
4-methylumbelliferone
2-methyl-1,4-naphthoquinone
N-methyl-2-quinolone
2-nitrofluorene
benzil
acetophenone
3-(2-furyl)acrylophenone
2-furaldoxime
cholesteryl crotonate
1,2-naphthoquinone
5-phenyl-2,4-pentadienophenone
benzanthracene-7,12-dione
benzanthracene-7-one These sensitizers are generally added in amounts of 2.5% to 10% by weight based on the weight of the photosensitive polymer.

The sensitizer may be applied either in solution with the polymer or separately from a suitable solvent over the photopolymer after it has been applied, to a support member. It is preferable, however, that the sensitizing agent be applied in a solution with the polymer.

In order to regulate or control the degree of cross-linking and/or to stabilize the photosensitive polymer over a period of time, an inhibitor may be added. Typical inhibitors include: hydroquinone, m-methoxyphenol, p-methoxyphenol, guaiacol, chloranil and 4-t-butylcatechol.

This invention is also concerned with the formation of plates and films derived from the photosensitive mixture of the herein subject polymers and sensitizing agent. The process used makes possible the formation of coated printing films on any substrate by the deposition of the photosensitive mixture using well-known techniques. Typical substrates include metal sheets, e.g., copper, aluminum, zinc, etc., glass, cellulose, polyester film, polyvinyl acetal film, polystyrene film, polyethylene terephthalate film, etc.

When the support material carrying the photosensitive composition is light-reflecting, there may be present, e.g., superposed on said support and adherent thereto or in the surface thereof, a layer or stratum absorptive of actinic light such as to minimize reflectance from the combined support of incident actinic light.

The plates formed wholly of or coated with the photosensitive composition are useful in photography, photomechanical reproductions, lithography and intaglio printing. More specific examples of such uses are offset printing, silk screen printing, duplicating pads, manifold stencil sheeting coatings, lithographic plates, relief plates and gravure plates. The term "printing plates" as used in the claims is inclusive of all of these.

They are also of great value in the printed circuit industry, as etching and electroplating resists, and for defining circuit images. Other uses are for chemical machining and for nameplate processes, where metals are removed by etching according to the photographic resist image.

Example I

A phenoxy resin PKHH[1] (36.0) (mol. wt. approx. 25,000) having the structural backbone

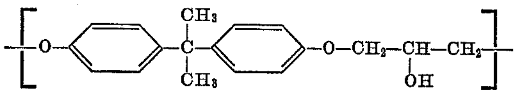

is dissolved in dry pyridine (200 ml.). Furoyl chloride (12.5 ml.) is added and the temperature rises to 40° C. due to an exothermic reaction. Upon completion of addition, the reaction mixture is heated to 40–50° C. for 2 hours with stirring. After cooling, the reaction mixture is diluted with acetone (500 ml.) and then poured into 4 liters of cold water. The precipitated product is filtered, water washed and air dried. I.R. analysis confirms the presence of furoate moiety in the end product.

Example II

A polyester resin K 1979[2] (50.0 g.) (mol. wt. about 2000) having —OH content of 7% is dissolved in N-methyl-2-pyrrolidone (250 ml.). Furoyl chloride (15.0 g.) is then added and, on completion of addition, the reaction mixture is heated at 60–65° C. for 4 hours with stirring. The mixture is diluted with acetone (1000 ml.) and poured into a large volume of water containing 5% aluminum sulfate. After standing overnight, the reaction mixture is filtered in order to isolate the precipitated product which is washed with water and air dried in the absence of actinic light. An I.R. spectrum substantiates product structure by indicating the presence of the furoate moiety.

A polyester (mol. wt. of approximately 2000) prepared by fusing a mixture of phthalic anhydride, maleic anhydride and propylene glycol at 200° C. under a nitrogen gas blanket is substituted in place of polyester resin K 1979 in the aforedescribed procedure to yield a corresponding product.

Example III

A styrene-allyl alcohol copolymer resin RJ–100[3] (mol. wt. 1600) (50 g.) is dissolved in N-methyl-2-pyrrolidone (250 ml.). Furoyl chloride (20.0 g.) is then added and the reaction mixture is heated to 60° C. for 3 hours with constant stirring. It is then cooled, diluted with acetone (1000 ml.) and poured into a large volume of water. The precipitated product is filtered water washed and dried. Good yields of products are obtained.

Example IV

The procedure of Example I is repeated wherein 5-bromo 2-furoyl chloride, in stoichiometric equivalent amounts, is used in place of furoyl chloride and good yields of corresponding polymer product are obtained.

Example V

The procedure of Example I is repeated wherein the following furoyl chloride derivatives are used, in stoichiometric equivalent amounts, in place of furoyl chloride to provide corresponding polymer products in good yields:

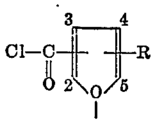

3-methyl-2-furoyl chloride
4-dodecyl-2-furoyl chloride
4-dodecenyl-2-furoyl chloride
5-propenyl-3-furoyl chloride
4-phenyl-2-furoyl chloride
4-(p-methylphenyl)-2-furoyl chloride
4-phenylethyl-2-furoyl chloride
3-chloro-2-furoyl chloride
4-bromo-2-furoyl chloride
3-fluoro-2-furoyl chloride
4-nitro-3-furoyl chloride
3-hydroxy-2-furoyl chloride
5-cyano-2-furoyl chloride
5-acetyl-2-furoyl chloride
3-amino-2-furoyl chloride
4-dimethylamino-2-furoyl chloride
5-trifluoromethyl-2-furoyl chloride
5-trifluoromethoxy-2-furoyl chloride
4-methoxy-2-furoyl chloride
5-butylamino-2-furoyl chloride
5-acetoxy-2-furoyl chloride
3-carbamyl-2-furoyl chloride
4-butoxy-2-furoyl chloride
5-dimethylcarbamyl-2-furoyl chloride
5-propylcarbamyl-2-furoyl chloride
5-butylsulfonyl-2-furoyl chloride
5-methoxymethyl-2-furoyl chloride
5-carbobutoxy-2-furoyl chloride
5-phenyl-2-furoyl chloride
5-(p-chlorophenyl)-2-furoyl chloride
5-(p-methylphenyl)-2-furoyl chloride
5-(p-aminophenyl)-2-furoyl chloride.

The analogous furan acrylic acid esters of the materials listed above are substituted to provide corresponding products.

[1] PKHH is a trademarked phenoxy resin product of Union Carbide.
[2] K 1979 is a trademarked product of Lawter Chemical Co.
[3] RJ–100 is a trademarked product of Monsanto Chemical Co.

Example VI

Photochemical insolubilization.—The furoate-esterified polymer (3 g.) obtained by the procedure of Example I is dissolved in methyl Cellosolve acetate (100 g.) containing benzanthracene 7,12-dione (0.18 g.). The resulting solution is coated on a previously cleaned copper-epoxy printed circuit laminate and then dried.

It is then exposed to a printed circuit image on a film transparency, using a pulsed xenon 8000 watt lamp, 36 inches away, for three minutes. A mixture of xylene and methyl Cellosolve acetate is used to dissolve the unexposed coating. After rinsing with water and drying, the copper is satisfactorily etched in a cupric chloride solution.

Example VII

The furoate-esterified polymer (3 g.) obtained by the procedure of Example II is dissolved in methyl Cellosolve acetate (100 g.) containing benzophenone (0.18 g.). The resulting solution is coated on a grained aluminum lithographic plate and dried.

It is then exposed for 4 minutes to a halftone negative using the exposing system of Example VI. Unexposed coating is removed with a mixture of monochlorobenzene and xylene. After rinsing with water and drying, the aluminum plate is placed on a lithographic press and satisfactory prints are produced.

Example VIII

The furoate-esterified polymer (3 g.) obtained by the procedure of Example III is dissolved in methylethyl ketone and sensitized with benzanthracene-7,12-dione (0.18 g.). The resulting solution is coated on a copper photoengraving plate and dried.

It is then exposed for 3½ minutes to a combination line and halftone negative transparency using the exposing system of Example VI. Unexposed coating is removed with methyl alcohol. After rinsing with water and drying, the copper plate is then etched with ferric chloride to form a relief printing image.

Example IX

The furoate-esterified polymer (3.3 g.) obtained by the procedure of Example IV is photochemically insolubilized by the procedure outlined in Example VI. However, a 20% ammonium persulfate solution was used instead of cupric chloride to etch the copper.

Example X

The procedure of Example VI is repeated except the following sensitizers in equivalent amounts are used instead of benzanthracene-7,12-dione with comparable results:

4-methyl benzophenone
4,4'-bis-dimethylamino benzophenone
4,4'-bis-diethylamino benzophenone
bis-p-methylstyryl ketone
4-methylumbelliferone
2-methyl-1,4-naphthoquinone
N-methyl-2-quinolone
2-nitrofluorene
3-(2-furyl)acrylophenone
2-furaldoxime
cholesteryl crotonate
1,2-naphthoquinone
5-phenyl-2,4-pentadieneophenone
benzanthracene-7,12-dione
benzanthracene-7-one
benzophenone
benzil.

Example XI

The procedure of Example I is repeated wherein furan acrylic acid chloride, in stoichiometric equivalent amounts, is used in place of furoyl chloride with comparable results.

This product (3 g.) is then subjected to the photochemical insolubilization technique outlined in Example VI. A satisfactory printed copper circuit is obtained.

Example XII

The procedure of Example I is repeated wherein 2,4,5-trimethyl-2-furoyl chloride, in stoichiometric equivalent amounts, is used in place of furoyl chloride with comparable results.

This product (3 g.) is then subjected to the photochemical insolubilization technique outlined in Example VI. A satisfactory printed copper circuit is obtained.

What is claimed is:

1. A light sensitive organic solvent soluble film forming polymer capable of forming a continuous coating on a base which comprises the recurring unit structure

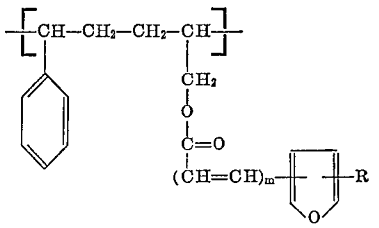

wherein R is H, alkyl or alkenyl of up to 12 carbon atoms, aryl, alkaryl or aralkyl of from 6 to 9 carbon atoms, halogen (F, Cl, Br), nitro, cyano, hydroxy, acetylamino, amino, alkoxy, carboalkoxy, mono- or di-alkylamino, N-alkyl-carbamyl, N,N-dialkylcarbamyl, alkylsulfonyl, said alkyl groups containing from 1 to 4 carbon atoms, trifluoromethyl, trifluoromethoxy, methoxymethyl, carbamyl, alkanoyloxy containing up to 4 carbon atoms, phenyl, p-chlorophenyl, p-methylphenyl or p-aminophenyl; and *m* is a whole number from 0 to 1, said polymer having a molecular weight of from 1500 to 115,000.

2. A polymer as claimed in claim 1 wherein at least 50% of the possible —OH groups of said hydroxy-containing polymer are esterified.

3. A polymer as claimed in claim 1 wherein *m* is zero.

4. A polymer as claimed in claim 1 wherein R is H.

5. A polymer as claimed in claim 1 wherein R is H and *m* is zero.

References Cited

UNITED STATES PATENTS

| | | | |
|---|---|---|---|
| 3,497,354 | 2/1970 | Steppan | 96—35.1 |
| 3,644,289 | 2/1972 | Sayigh | 260—47 CB |

JAMES A. SEIDLECK, Primary Examiner

C. A. HENDERSON, Jr., Assistant Examiner

U.S. Cl. X.R.

96—35.1, 115; 260—47 EP, 47 UP, 75 T, 79.3 R, 86.7, 87.3, 88.1 PC